(12) United States Patent
Noda (10) Patent No.: US 9,500,748 B2
(45) Date of Patent: Nov. 22, 2016

(54) TARGET RECOGNITION APPARATUS

(71) Applicant: DENSO CORPORATION, Kariya, Aichi-pref. (JP)

(72) Inventor: Kazuhiro Noda, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 251 days.

(21) Appl. No.: 14/174,051

(22) Filed: Feb. 6, 2014

(65) Prior Publication Data

US 2014/0218228 A1 Aug. 7, 2014

(30) Foreign Application Priority Data

Feb. 7, 2013 (JP) ................................ 2013-022384

(51) Int. Cl.
*G01S 13/86* (2006.01)
*G01S 13/58* (2006.01)
(Continued)

(52) U.S. Cl.
CPC ............... *G01S 13/86* (2013.01); *G01S 7/354* (2013.01); *G01S 13/584* (2013.01); *G01S 13/867* (2013.01); *G01S 13/931* (2013.01); *B60K 2031/0041* (2013.01); *G01S 13/34* (2013.01); *G01S 13/4454* (2013.01); *G01S 13/72* (2013.01)

(58) Field of Classification Search
CPC ............................. G01S 13/50; G01S 13/5244
USPC ......................................................... 342/147
See application file for complete search history.

(56) References Cited

U.S. PATENT DOCUMENTS

2003/0179129 A1* 9/2003 Tamatsu ................... G01S 7/354
342/70
2007/0286475 A1 12/2007 Sekiguchi 2014/0035775 A1* 2/2014 Zeng ..................... G01S 13/867
342/52

FOREIGN PATENT DOCUMENTS

JP 06-150195 5/1994
JP 2007-263986 10/2007
(Continued)

OTHER PUBLICATIONS

Office Action (with English translation) dated Jan. 13, 2015 in corresponding Japanese Application No. 2013-022384.

*Primary Examiner* — Peter Bythrow
*Assistant Examiner* — Helena Seraydaryan
(74) *Attorney, Agent, or Firm* — Harness, Dickey & Pierce, P.L.C.

(57) ABSTRACT

In a target recognition apparatus, a candidate detection section detects a target candidate, provided that a target exists in a basic detection area. A candidate addition section adds, regarding each target candidate detected in a folding area, a target candidate determined provided that the target candidate detected in the folding area is a virtual image, and a corresponding real image exists in an additional detection area. A tracking section determines, regarding each detected and added target candidate, presence/absence of a history connection with the target candidate detected in a past measurement cycle. A combination determination section determines, regarding each target candidate, presence/absence of a combination with an image target, based on whether or not an image target associated with the target candidate exists. A likelihood calculation section sets and updates a likelihood of a virtual image of the image target by using a determination result of the combination determination section.

5 Claims, 4 Drawing Sheets

(51) Int. Cl.
*G01S 13/93* (2006.01)
*G01S 7/35* (2006.01)
*G01S 13/34* (2006.01)
*G01S 13/44* (2006.01)
*G01S 13/72* (2006.01)
*B60K 31/00* (2006.01)

(56) References Cited

FOREIGN PATENT DOCUMENTS

| | | |
|---|---|---|
| JP | 2007-310741 | 11/2007 |
| JP | 2012-229948 | 11/2012 |

* cited by examiner

| ① MILLIMETER WAVES:<br>FOLDING FG + COMBINATION WITH<br>IMAGE OF PEDESTRIAN<br>(Max:80,Min:50) [%] | | MILLIMETER-WAVE SENSOR OUTPUT | |
|---|---|---|---|
| | | FOLDING FG=ON | FOLDING FG=OFF |
| COMBINATION OF MILLIMETER<br>WAVES AND IMAGE OF<br>PEDESTRIAN | ON | LIKELIHOOD — — | LIKELIHOOD — — |
| | OFF | LIKELIHOOD + | LIKELIHOOD — |

FIG.5B

| ② MILLIMETER WAVES + ACCUMULATED<br>NUMBER OF COMBINATIONS<br>WITH IMAGE OF PEDESTRIAN<br>(Max:50,Min:20) [%] | | COMBINATION OF MILLIMETER WAVES<br>AND IMAGE OF PEDESTRIAN | |
|---|---|---|---|
| | | ON | OFF |
| COMBINATION TARGET NEW FG | ON | LIKELIHOOD=50⇒LIKELIHOOD — | LIKELIHOOD=50 |
| | OFF | LIKELIHOOD — | NO CHANGE |

FIG.5C

| ③ TARGET MOVEMENT STATE<br>(Max:50,Min:20) [%]<br>※LINEAR INTERPOLATION | LATERAL MOVEMENT SPEED [kph] | | |
|---|---|---|---|
| | ~1.0 | 5.0~8.0 | 12.0~ |
| | 50 | 20 | 50 |

FIG.6

TARGET RECOGNITION APPARATUS

CROSS-REFERENCE TO RELATED APPLICATION

This application is based on and claims the benefit of priority from earlier Japanese Patent Application No. 2013-22384 filed Feb. 7, 2013, the description of which is incorporated herein by reference.

BACKGROUND

1. Technical Field

The present invention relates to a target recognition apparatus which recognizes a target by using information from a radar sensor and an image sensor.

2. Related Art

Conventionally, various target recognition apparatus are used for, for example, driving support of a vehicle. The target recognition apparatus recognizes various targets existing around the vehicle by using a radar sensor and an image sensor.

A millimeter-wave radar, which is a radar sensor, receives a reflected wave, which is generated when a radar wave is reflected from a target, by a plurality of antennas, and determines the direction of the target, which has reflected the radar wave, by using a phase difference $\Delta\phi$ generated between received signals of the antennas. However, $\Delta\theta=\theta0$ ($|\theta0|<\pi$) and $\Delta\theta=\theta0\pm2n\pi$ (n=1, 2, . . . ) cannot be distinguished from each other due to periodicity in phase.

Hence, if a target exists within an azimuth range (basic detection area) corresponding to a range in which a phase difference $\Delta\theta$ meets $-\pi<\Delta\theta\leq+\pi$[rad], the direction of the target can be correctly detected. However, it is known that if a target exists outside the basic detection area, that is, within a range in which the phase difference $\Delta\theta$ meets $\Delta\theta\leq-\pi$ or $\Delta\theta>\pi$, the direction of the target is erroneously detected such that the direction of the target is apparently in the basic detection area.

JP-A-2007-263986 discloses a method for preventing such erroneous detection due to phase folding. According to this method, the position of a target candidate detected by radar is verified by a camera. If a target corresponding to the detection result of the radar is recognized, the detection result of a millimeter-wave radar is determined as true (a real image). If a target corresponding to the detection result of the radar is not recognized, the detection result of a millimeter-wave radar is assumed as a virtual image due to phase folding. In this case, target recognition using a camera is performed again for the direction (position) outside a basic detection area where a real image is expected to exist. In consequence, if a target exists, the expected position is used as a target position.

However, according to the apparatus disclosed in JP-A-2007-263986, if erroneous recognition is caused at the camera side, a virtual image (ghost) due to phase folding is erroneously recognized as a real image. Hence, stable recognition results cannot be obtained.

SUMMARY

An embodiment provides a target recognition apparatus which improves accuracy in recognizing a target within an angular range where phase folding occurs in a radar sensor.

As an aspect of the embodiment, a target recognition apparatus is provided which recognizes an object in a predetermined measurement cycle by using a radar sensor, in which a basic detection area is defined where a direction of the object is uniquely determined from a phase difference of received signals, an additional detection area is defined which is adjacent to the basic detection area and where if a target exists therein, a virtual image is detected in the basic detection area due to phase folding, a folding area is defined which is in the basic detection area and where the virtual image appears, and the basic detection area and the additional detection area are defined as a search area, and an image sensor in which an angular range wider than the search area of the radar sensor is defined as an imaging area.

The apparatus includes: a candidate detection section which detects a target candidate in the measurement cycle, provided that a target exists in the basic detection area, based on a detection result of the radar sensor; a candidate addition section which adds, regarding each target candidate detected in the folding area by the candidate detection section, a target candidate determined provided that the target candidate detected in the folding area is a virtual image, and a corresponding real image exists in the additional detection area; a tracking section which determines, regarding each target candidate detected and added by the candidate detection section and the candidate addition section, presence/absence of a history connection with the target candidate detected in a past measurement cycle; a combination determination section which determines, regarding each target candidate, presence/absence of a combination with an image target, based on whether or not an image target associated with the target candidate exists in image targets which are detected by the image sensor; and a likelihood calculation section which sets and updates a likelihood of a virtual image of the image target by using a determination result of the combination determination section.

BRIEF DESCRIPTION OF THE DRAWINGS

In the accompanying drawings:

FIG. 2 is an explanatory drawing showing a search area and the like;

DETAILED DESCRIPTION OF THE PREFERRED EMBODIMENTS

With reference to the accompanying drawings, hereinafter is described an embodiment of the present invention.

<General Configuration>

Figure 1:
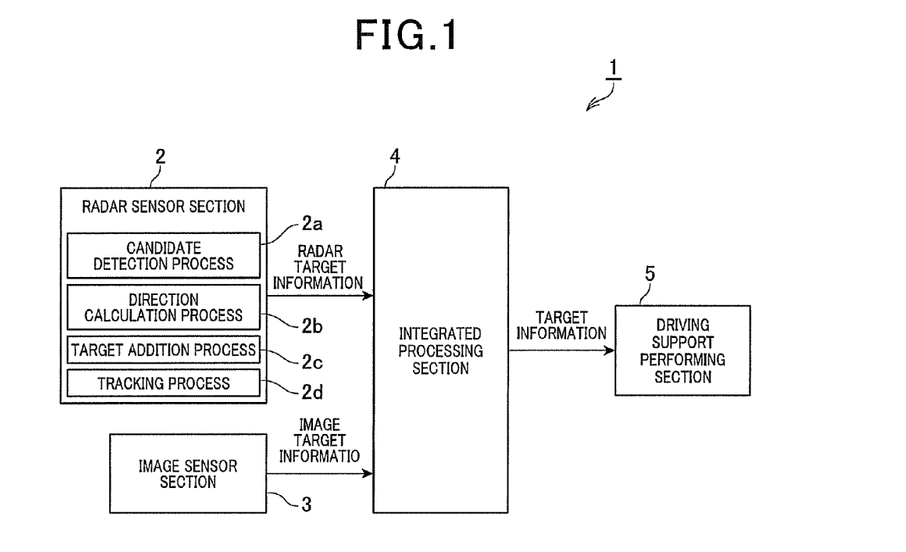
FIG. 1 is a block diagram showing a configuration of a driving support system.

As shown in FIG. 1, a driving support system 1 includes a radar sensor section 2, an image sensor section 3, an integrated processing section 4, and a driving support performing section 5. The radar sensor section 2 radiates a radar wave toward a search area set ahead of an own vehicle, and receives a reflected wave of the radar wave. The image sensor section 3 takes an image of the search area. The integrated processing section 4 detects various targets existing in the search area in accordance with detection results of the radar sensor section 2 and the image sensor section 3. The driving support performing section 5 controls various in-vehicle instruments in accordance with processing results of the integrated processing section 4 to perform predetermined driving support. In the driving support system 1, the integrated processing section 4 is connected to the radar sensor section 2, the image sensor section 3, and the driving support performing section 5 so as to communicate therewith. Note that the configuration for realizing the communication is not limited to the above.

<Radar Sensor Section>

The radar sensor section 2 is disposed in a front end portion of the vehicle and is configured by a known FMCW (Frequency Modulated Continuous Wave) radar which detects a target existing in a predetermined search area by using millimeter waves. The radar sensor section 2 transmits information on a reflection point (target candidate, candidate target), at which the millimeter waves are reflected, to the integrated processing section 4 as radar target information. Note that, in the radar sensor section 2, at least one of a transmitting antenna and a receiving antenna is configured by an array antenna. The combination of the transmitting antenna and the receiving antenna is referred to as a channel. The radar sensor section 2 transmits and receives millimeter waves using a plurality of channels, and can perform direction detection by using phase differences between received signals obtained by the channels.

The radar sensor section 2 includes a candidate detection processing section 2a and a direction calculation processing section 2b. The candidate detection processing section 2a detects a distance from the own vehicle to each target candidate and the relative speed between the own vehicle and each target candidate by a known method using an FMCW radar. The direction calculation processing section 2b determines the direction in which a target candidate exists by using a phase difference between received signals of reflected waves. In addition, the radar sensor section 2 includes a candidate addition processing section 2c and a tracking processing section 2d. If a target candidate detected by the candidate detection processing section 2a can be a virtual image generated by so-called phase folding (aliasing), the candidate addition processing section 2c determines the direction, in which it is estimated that a real image exists, and adds the real image as one target candidate (which is located at the same distance and has the same relative speed as those of the original target candidate). The tracking processing section 2d determines whether each of the target candidates detected and added by the candidate detection processing section 2a and the target addition processing section 2c has a relationship in a history connection with a target candidate detected in the past measurement cycle (whether or not the two target candidates are the same). Note that the sections 2a to 2d are realized by a process performed by a CPU. In addition, since the candidate detection process, the direction calculation process, the target addition process, and the tracking process performed by the sections 2a to 2d are known processes, detailed explanations thereof are omitted.

Figure 2:
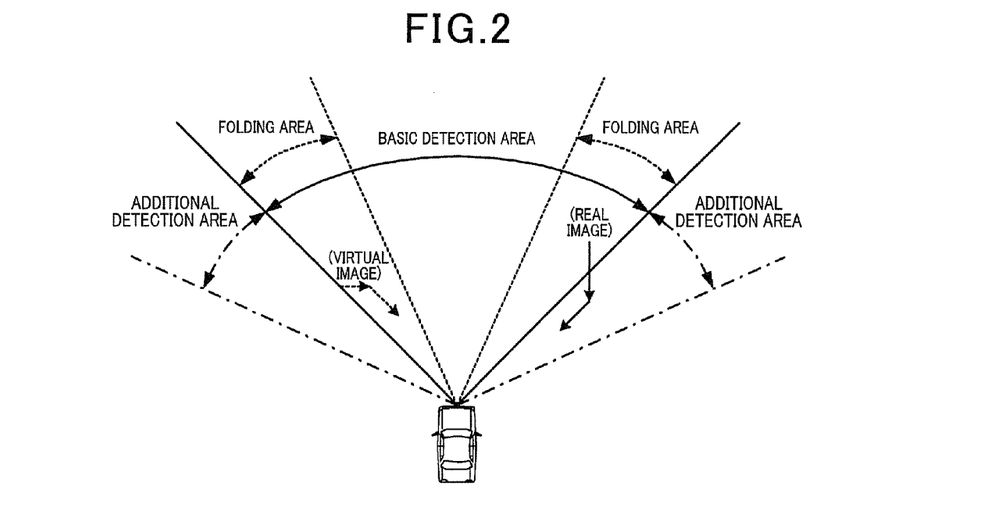

Note that, as shown in FIG. 2, an angular range corresponding to a range $(-\pi < \Delta\theta \leq \pi)$, where a direction can be uniquely determined from a phase difference $\Delta\theta$ of received signals, is referred to as a basic detection area. A range adjacent to the basic detection area on either side thereof is referred to as an additional detection area. If a target (real image) exists in the additional detection area, a virtual image is detected in the basic detection area due to phase folding. An area in the basic detection area where the virtual image appears is referred to as a folding area.

That is, the radar sensor section 2 detects a target candidate from a search area, which is the whole of the basic detection area and the additional detection area. Target candidates detected by the radar sensor section 2 include a candidate detected outside the folding area of the basic detection area, a candidate detected inside the folding area of the basic detection area, and a candidate added. It is deemed that a real image of the candidate detected as a virtual image in the folding area exists in the additional detection area, so that the candidate is added. Hereinafter, the target candidate detected in the folding area and the target candidate added in response to the target candidate detected in the folding area are referred to as folding candidates. The folding candidates and target candidates detected outside the folding area of the basic detection area are collectively referred to as radar candidates. For each of the radar candidates, radar target information is generated.

The radar target information includes the distance from the own vehicle to a target candidate, the relative speed of the target candidate with respect to the own vehicle, the direction in which the target candidate exists when viewed from the own vehicle, a folding flag indicating whether or not the target candidate is a folding candidate (the folding flag is in an on state if the target candidate is a folding candidate), and history connection information obtained by the tracking process.

According to the target addition process, the folding flag is set to an on state if the target candidate is a folding candidate, and the folding flag is set to an off state if the target candidate is not a folding candidate. The history connection information includes a new flag indicating presence/absence of a history connection with a target candidate detected in the past (If there is no history connection, the new flag is in an on state), and the connection number of times indicating the number of times history connections are confirmed in the past. Note that the target candidate whose new flag is in an off state takes over the history connection information of a past target candidate which has a connection relationship therewith.

<Image Sensor Section>

The image sensor section 3 includes a CCD camera disposed in the vicinity of the center of the front part of the own vehicle. The imaging area of the CCD camera is an angular range wider than the search area (basic detection area+additional detection areas: see FIG. 2) of the radar sensor. The image sensor section 3 performs known image processing such as template matching for image data of an image took by the CCD camera to detect a predetermined target (vehicle, pedestrian (foot passenger) and the like) existing in the imaging area. The image sensor section 3 transmits information on the target detected by this process (hereinafter, referred to as "image target") to the integrated processing section 4 as image target information. Note that the image target information includes the type, size, and position of the detected image target.

<Driving Support Performing Section>

In-vehicle instruments, which are controlled objects of the driving support performing section 5, include a monitor displaying various types of images and a loudspeaker outputting an audible alarm and a guidance sound. In addition, the in-vehicle instruments, which are controlled objects, may include various types of controllers controlling an internal-combustion engine, a power train mechanism, a braking mechanism and the like, which are installed in the own vehicle.

<Integrated Processing Section>

The integrated processing section 4 is mainly configured by a microcomputer including a CPU, a ROM, and a RAM. The integrated processing section 4 performs a target recognition process which generates target information to be provided to the driving support performing section 5 based on the radar target information and the image target information obtained from the radar sensor section 2 and the image sensor section 3.

Figure 3:
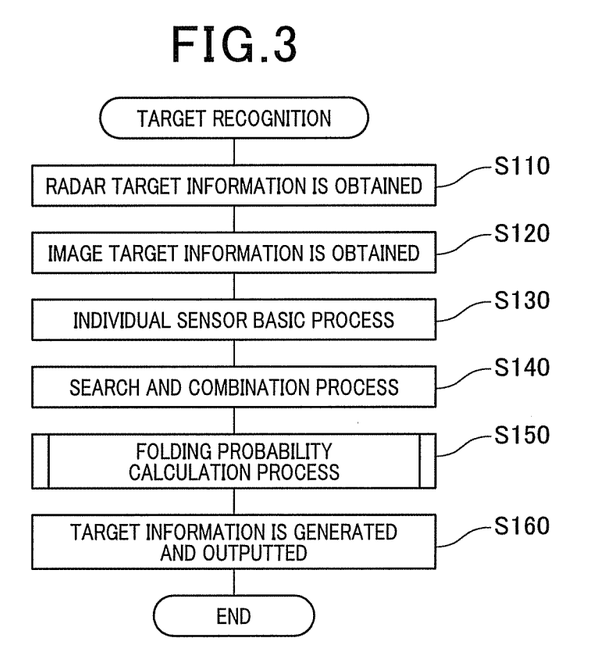
FIG. 3 is a flowchart showing a target recognition process.

Hereinafter, the target recognition process is described according to the flowchart shown in FIG. 3. This process is repeatedly performed in a predetermined measurement cycle after the engine starts.

First, in S110, the integrated processing section 4 obtains the radar target information generated by the radar sensor section 2. In S120, the integrated processing section 4 obtains the image target information generated by the image sensor section 3.

In succeeding S130, the integrated processing section 4 performs an individual sensor basic process. In this process, a search range (an area on an image) is set in which it is predicted that an image target corresponding to a radar target is detected, based on the radar target information. Conversely, a search range (distance, direction) is set in which it is predicted that a radar target corresponding to the image target is detected, based on the image target information. Furthermore, various types of calculations are performed by using, in addition to the radar target information and the image target information, behavioral information on a vehicle (vehicle speed, acceleration, yaw rate and the like) obtained from parts (not shown) of the vehicle to generate basic information related to the radar target and image target.

In succeeding S140, the integrated processing section 4 performs a search and combination process. In this process, by searching the search range determined in S130, combination information is generated which shows whether or not an image target corresponding to the radar target exists. If an image target corresponding to the radar target exists, the combination information is set to a value indicating "combination presence". If an image target corresponding to the radar target does not exist, the combination information is set to a value indicating "combination absence". In addition, if it is determined that the radar target is "combination presence", information on the image target (image target information), which has a combination relationship with the radar target, is merged with information on the radar target (radar target information). Furthermore, the combination information is added to the merged information, thereby generating combination target information. Conversely, if it is determined that the radar target is "combination absence", only the combination information is added to the information on the radar target (radar target information), thereby generating combination target information.

In succeeding S150, the integrated processing section 4 performs a folding probability calculation process (described later) which calculates a likelihood indicating a probability that each candidate target indicated by the candidate target information is a virtual image due to phase folding.

In succeeding S160, an upper predetermined number of candidate targets are extracted as detected targets according to predetermined priority, from candidate targets (i.e. folding targets) whose folding flags are in an on state and whose likelihoods determined in S150 are lower than a predetermined value, and candidate targets (i.e. non-folding targets) whose folding flags are in an off state. The target information regarding the extracted detection targets (combination target information) is transmitted to the driving support performing section 5. Then, the present process is ended.

Figure 4:
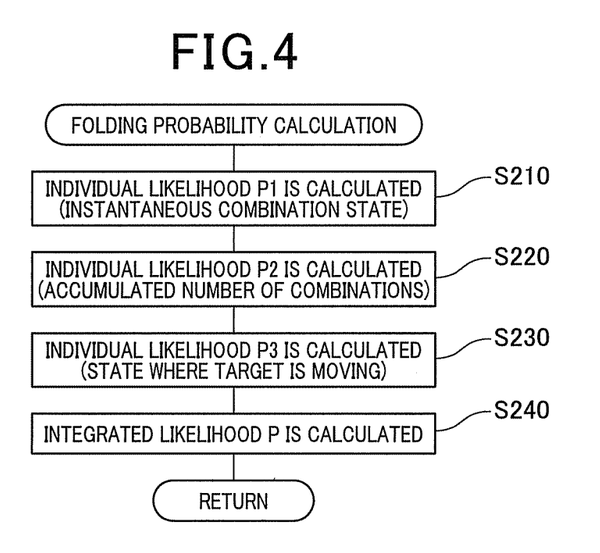
FIG. 4 is a flowchart showing a folding probability calculation process.

Next, the folding probability calculation process performed in S150 is described in detail according to the flowchart shown in FIG. 4.

When the present process starts, first, in S210, an individual likelihood P1 indicating an instantaneous combination state is calculated. In particular, regarding a candidate target whose new flag is set to an on state, the individual likelihood P1 is initialized so as to be P1=50 [%]. In contrast, if the individual likelihood P1 is took over from the candidate target whose new flag is set to an off state, that is, the candidate target detected in the past measurement cycle when it is determined that a history connection is present, the individual likelihood P1 is increased or decreased according to the setting of the folding flag and the combination information.

Figure 5A:
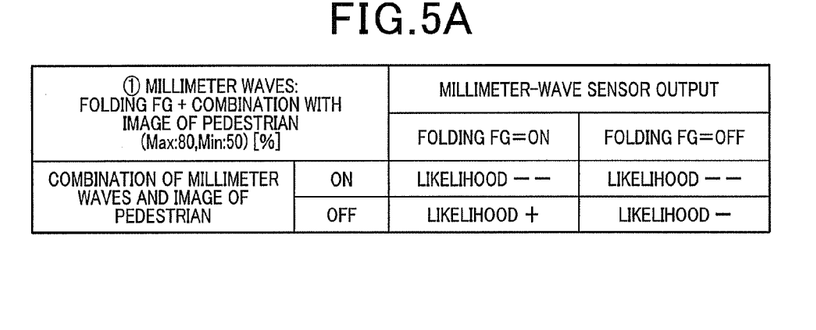
FIGS. 5A, 5B and 5C are explanatory drawings showing a process for setting and updating an individual likelihood.

That is, as shown in FIG. 5A, in a state where the folding flag is in an on state, if the combination information is "combination presence", it is determined that the possibility that the candidate target is a folding (virtual image) is low, thereby decreasing the individual likelihood P1 by a predetermined value. If the combination information is "combination absence", it is determined that the possibility that the candidate target is a folding (virtual image) is high, thereby increasing the individual likelihood P1 by a predetermined value. In addition, in a state where the folding flag is in an off state, the possibility that the candidate target is a folding (virtual image) is low regardless of the combination information. Hence, the individual likelihood P1 is decreased by a predetermined value. However, the decreased value of the individual likelihood P1 in a state where the combination information is "combination presence" may be larger than that in a state where the combination information is "combination absence". In this embodiment, the maximum value of the individual likelihood P1 is limited to 80 [%], and the minimum value of the individual likelihood P1 is limited to 50 [%]. Thereby, the individual likelihood P1 is set so as to be a value evaluating a likelihood of a virtual image.

Figure 5B:
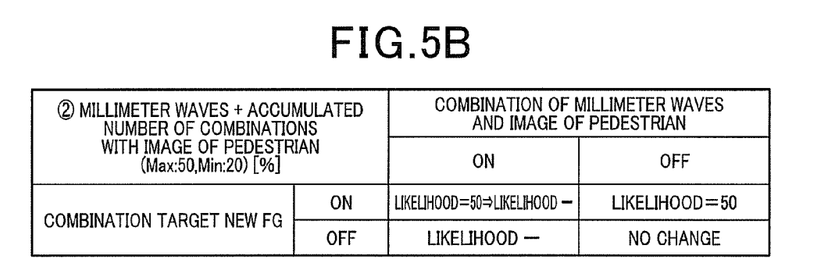

In succeeding S220, an individual likelihood P2 is calculated which is depending on the accumulated number of combinations which is an accumulation value of the number of confirmations that a radar target is combined with an image target. In particular, regarding the candidate target whose new flag is set to an on state, the individual likelihood P2 is initialized so as to be P2=50 [%]. In contrast, regarding the candidate target whose new flag is set to an off state, the individual likelihood P2 is decreased if the combination information is "combination presence", and the individual likelihood P2 is maintained if the combination information is "combination absence". In this embodiment, the maximum value of the individual likelihood P2 is limited to 50 [%], and the minimum value of the individual likelihood P2 is limited to 20 [%]. Thereby, the individual likelihood P2 is set so as to be a value evaluating a likelihood of a real image (unlikelihood of a virtual image).

Figure 5C:
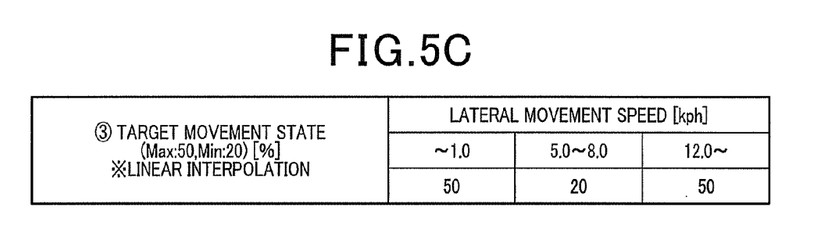

In succeeding S230, an individual likelihood P3 is calculated which indicates a state where the target is moving. The individual likelihood P3 differs from the above individual likelihoods P1 and P2, and is instantaneously determined every measurement cycle regardless of the setting of the new flag. In particular, if the movement speed of the candidate target is within a permissible range (here, 5.0 to 8.0 [km/h]) set according to an average characteristic of a pedestrian which is a detection object within the additional detection area, the individual likelihood P3 is set to a value less than 50 [%] (here, 20 [%]). If the movement speed of the candidate target is within a non-permissible range (less than 1.0 [km/h] or equal to or more than 12.0 [km/h]) which is outside the average characteristic of a pedestrian, the individual likelihood P3 is set to a value of 50 [%]. If the movement speed of the candidate target is between the permissible range and the non-permissible range, the individual likelihood P3 is set to a value subject to linear interpolation between 20 [%] and 50 [%] depending on the movement speed. Note that the individual likelihood P3 is set so as to be a value evaluating a likelihood of a pedestrian.

In succeeding S240, an integrated likelihood P is calculated by using the expression (2) based on the individual likelihoods P1 to P3.

$$P(X) = \frac{P_1(X_1)P_2(X_2)P_3(X_3)}{P_1(X_1)P_2(X_2)P_3(X_3) + (1-P_1(X_1))(1-P_2(X_2))(1-P_3(X_3))} \quad (1)$$

Note that X indicates a situation of each time. Xi (i=1, 2, 3) indicates a situation in which the value of an individual likelihood Pi is determined. That is, X1 indicates a set value of a folding flag in a current measurement cycle and contents of the combination information. P1(X1) indicates the individual likelihood P1 in the current measurement cycle calculated according to the X1 and the individual likelihood P1 took over from the target candidate detected in the past measurement cycle.

<Operation Example>

Figure 6:
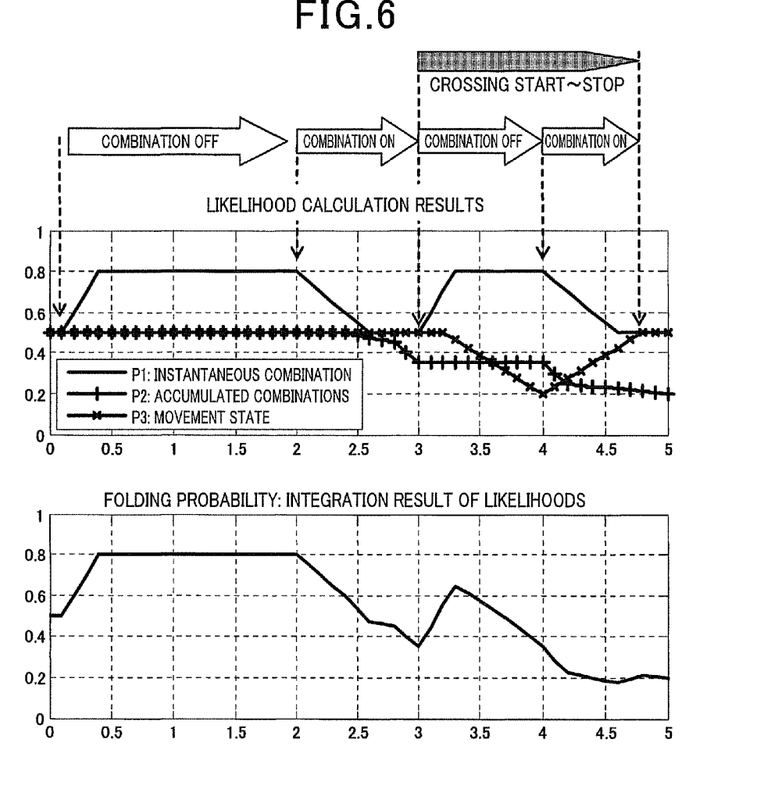
FIG. 6 is a graph exemplifying states where an individual likelihood and an integrated likelihood vary.

A calculation example of the integrated likelihood P integrating the individual likelihoods P1 to P3 is described with reference to FIG. 6. As shown in FIG. 6, first, in a state where a radar target is detected but a combination with an image target is not confirmed, the individual likelihoods P1 and P2 are initialized so as to be 50 [%] (P1 is a value between the maximum value and the minimum value, P2 is the minimum value). Thereafter, the individual likelihood P1 increases at a predetermined rate every time when "combination absence (OFF)" is confirmed. If reaching the maximum value (P1=80 [%]), the individual likelihood P1 does not increase more than the maximum value and is maintained at the maximum value. The individual likelihoods P1 and P2 decrease at a predetermined rate every time when "combination presence (ON)" is confirmed. If reaching the minimum values (P1=50 [%], P2=20 [%]), the individual likelihoods P1 and P2 do not decrease less than the minimum value and is maintained at the minimum value.

That is, the individual likelihood P1 varies so as to increase or decrease between the minimum value (50 [%]) and the maximum value (80 [%]) according to the combination information. The individual likelihood P2 is initialized so as to be the maximum value (50 [%]) and varies so as to merely decrease with time according to the combination information.

The individual likelihood P3 is determined to be a value between the maximum value (50 [%]) and minimum value (20 [%]) depending on an instantaneous value of movement speed of the candidate target in every measurement cycle.

The integrated likelihood P determined according to the expression (1) becomes a value strongly influenced by one of the individual likelihoods P1 to P3, which is far from 50 [%].

<Advantages>

As described above, according to the present embodiment, the individual likelihood P1 indicating a likelihood of a virtual image and the individual likelihood P2 indicating a likelihood of a real image are determined based on a combination relationship between a radar target, which is a target candidate detected by the radar sensor sectionz 2, and an image target, which is a target candidate detected by image sensor section 3. Furthermore, the individual likelihood P3 indicating a likelihood of a pedestrian is determined from the movement speed of the target candidate. Based on the integrated likelihood P determined from the individual likelihoods P1 to P3, a target is selected which is an object whose information is provided to the driving support performing section 5.

In particular, values of the individual likelihoods P1 and P2 are took over regarding a target candidate whose new flag is in an off state, that is, a target candidate whose history connection with a target candidate detected in the past measurement cycle has been confirmed. Then, the individual likelihoods P1 and P2 are updated according to the combination information obtained in the current measurement cycle.

As described above, according to the present embodiment, whether a target candidate is a real image or a virtual image is determined by using the plurality of individual likelihoods P1 to P3 determined with different criterions. In addition, the individual likelihoods P1 and P2 are determined in time sequence. Hence, erroneous determination due to instantaneous erroneous recognition (erroneous combination) can be prevented.

In addition, as an individual likelihood, the individual likelihood P3 is included which is determined by using only information obtained in the current cycle. Hence, when a target candidate is an object (here, pedestrian) specifically requiring detection, a correct recognition result can be quickly obtained, that is, recognition can be done at an early stage.

In particular, when the driving support performing section 5 performs collision avoidance control for a recognized pedestrian, the pedestrian, which is an object of the collision avoidance control, exists near the vehicle. The pedestrian existing within the additional detection area is required to be detected quickly. The present embodiment can properly be used for such a case.

<Other Embodiments>

It will be appreciated that the present invention is not limited to the configurations described above, but any and all modifications, variations or equivalents, which may occur to those who are skilled in the art, should be considered to fall within the scope of the present invention. For example, a function included in one element may be divided into a plurality of elements. Functions included in a plurality of elements may be integrated into one element. In addition, at least part of the configuration of the above embodiment may be replaced with a known configuration having the same functions.

In the above embodiment, the integrated likelihood P is determined from three types of the individual likelihoods P1 to P3. However, the integrated likelihood P may be determined from two or equal to or more than four types of individual likelihoods.

Hereinafter, aspects of the above-described embodiments will be summarized.

The target recognition apparatus is provided which recognizes an object in a predetermined measurement cycle by using a radar sensor (2), in which a basic detection area is defined where a direction of the object is uniquely determined from a phase difference of received signals, an additional detection area is defined which is adjacent to the basic detection area and where if a target exists therein, a virtual image is detected in the basic detection area due to phase folding, a folding area is defined which is in the basic detection area and where the virtual image appears, and the basic detection area and the additional detection area are defined as a search area, and an image sensor (3) in which an angular range wider than the search area of the radar sensor is defined as an imaging area.

In the target recognition apparatus, a candidate detection section (2*a*) detects a target candidate in the measurement cycle, provided that a target exists in the basic detection area, based on a detection result of the radar sensor. A candidate addition section (2*c*) adds, for each target candidate detected in the folding area by the candidate detection section, a target candidate determined provided that the target candidate detected in the folding area is a virtual image, and a corresponding real image exists in the additional detection area.

In addition, a tracking section (2*d*) determines, regarding each target candidate detected and added by the candidate detection section and the candidate addition section, presence/absence of a history connection with the target candidate detected in a past measurement cycle. A combination determination section (4, S140) which determines, regarding each target candidate, presence/absence of a combination with an image target, based on whether or not an image target associated with the target candidate exists in image targets which are detected by the image sensor. A likelihood calculation section (4, S150) sets and updates a likelihood of a virtual image of the image target by using a determination result of the combination determination section.

According to the target recognition apparatus configured as described above, a likelihood of a virtual image of a candidate target, whose history connection is recognized, is determined in time sequence. Hence, whether the candidate target is a real image or a virtual image can be prevented from being erroneously determined due to instantaneous erroneous recognition (erroneous combination).

What is claimed is:

1. A target recognition apparatus, which recognizes an object in a predetermined measurement cycle by using a radar sensor, in which a basic detection area is defined where a direction of the object is uniquely determined from a phase difference of received signals, an additional detection area is defined which is adjacent to the basic detection area and where if a target exists therein, a virtual image is detected in the basic detection area due to phase folding, a folding area is defined which is in the basic detection area and where the virtual image appears, and the basic detection area and the additional detection area are defined as a search area, and an image sensor in which an angular range wider than the search area of the radar sensor is defined as an imaging area, comprising:

a candidate detection section which detects a target candidate in the measurement cycle, provided that a target exists in the basic detection area, based on a detection result of the radar sensor;

a candidate addition section which adds, regarding each target candidate detected in the folding area by the candidate detection section, a target candidate determined provided that the target candidate detected in the folding area is a virtual image, and a corresponding real image exists in the additional detection area;

a tracking section which determines, regarding each target candidate detected and added by the candidate detection section and the candidate addition section, presence/absence of a history connection with the target candidate detected in a past measurement cycle;

a correspondence determination section which determines, regarding each target candidate for which presence/absence of the history connection is determined by the tracking section, whether or not an image target corresponding to the target candidate exists in image targets which are detected by the image sensor; and a likelihood calculation section which sets a likelihood of the image target being a virtual image to an initial value for each target candidate determined to have no history connection by the tracking section and updates the likelihood for each target candidate determined to have a history connection by the tracking section based on a determination result of the correspondence determination section.

2. The target recognition apparatus according to claim 1, wherein the likelihood calculation section includes:

an individual likelihood calculation section which determines, by using a plurality of determination criterions, a likelihood corresponding to each of the determination criterions; and an integrated likelihood calculation section which determines an integrated likelihood integrating the likelihoods calculated by the individual likelihood calculation section.

3. The target recognition apparatus according to claim 2, wherein the individual likelihood calculation section, in which the target candidate detected inside the folding area by the candidate detection section and the target candidate added by the candidate addition section are defined as folding candidates, determines a first individual likelihood which increases when the folding candidate is determined not to have a corresponding image target and which decreases when the folding candidate is determined to have a corresponding image target.

4. The target recognition apparatus according to claim 2, wherein the individual likelihood calculation section determines a second individual likelihood which decreases when the target candidate is determined to have a corresponding image target, and which is maintained when the target candidate is determined not to have a corresponding image target.

5. The target recognition apparatus according to claim 2, wherein the individual likelihood calculation section determines, by using an average characteristic of a target which is a detection object in the additional detection area, a third individual likelihood which is set to a value lower than 50% when the average characteristic is met and which is set to a value equal to or more than 50% when the average characteristic is not met.

* * * * *